United States Patent
Gerk et al.

(10) Patent No.: US 7,810,587 B2
(45) Date of Patent: Oct. 12, 2010

(54) DRILL BITS COMPRISING DUAL-PHASE TUNGSTEN CARBIDE MATERIAL

(75) Inventors: Christian Gerk, Wallmoden (DE); Klause-Dieter Wernicke, Bad Sackingen (DE)

(73) Assignee: H.C. Starck GmbH (DE)

( * ) Notice: Subject to any disclaimer, the term of this patent is extended or adjusted under 35 U.S.C. 154(b) by 2 days.

(21) Appl. No.: 12/420,971

(22) Filed: Apr. 9, 2009

(65) Prior Publication Data

US 2009/0263646 A1 Oct. 22, 2009

Related U.S. Application Data

(63) Continuation of application No. 10/579,291, filed as application No. PCT/EP2004/012959 on Nov. 16, 2004, now Pat. No. 7,541,090.

(30) Foreign Application Priority Data

Nov. 21, 2003 (DE) ................................ 103 54 543

(51) Int. Cl.
*B32B 5/16* (2006.01)
*E21B 10/36* (2006.01)

(52) U.S. Cl. .................. 175/425; 428/328; 428/403

(58) Field of Classification Search ................. 428/403, 428/328; 175/425
See application file for complete search history.

(56) References Cited

U.S. PATENT DOCUMENTS

| | | |
|---|---|---|
| 3,660,050 A | 5/1972 | Iler et al. |
| 3,848,062 A | 11/1974 | Steiger et al. |
| 4,019,873 A | 4/1977 | Reiter |
| 4,066,451 A | 1/1978 | Rudy |
| 4,588,606 A | 5/1986 | Keshavan et al. |
| 4,723,996 A | 2/1988 | Brunet et al. |
| 5,096,689 A | 3/1992 | Terry et al. |
| 5,166,103 A | 11/1992 | Krstic |
| 5,453,241 A | 9/1995 | Akerman et al. |
| 5,612,264 A | 3/1997 | Nilsson et al. |
| 5,856,626 A | 1/1999 | Fischer et al. |
| 5,942,204 A | 8/1999 | Dunmead et al. |
| 6,248,149 B1 | 6/2001 | Massey et al. |
| 6,428,600 B1 | 8/2002 | Flurschutz et al. |
| 6,852,304 B2 | 2/2005 | Yaginuma et al. |
| 7,108,831 B2 | 9/2006 | Eckhart et al. |
| 7,118,635 B1 | 10/2006 | Gille et al. |
| 7,541,090 B2 * | 6/2009 | Gerk et al. .................. 428/403 |
| 2003/0053947 A1 | 3/2003 | Yaginuma et al. |
| 2007/0079905 A1 | 4/2007 | Gerk |

FOREIGN PATENT DOCUMENTS

DE     36 26 031     2/1988
EP     687 650       12/1995

OTHER PUBLICATIONS

Nayak B B: "Enhancement in the microhardness of arc plasma melted tungsten carbide" Journal of Materials Science Kluwer Academic Publishers USA, vol. 38, No. 12, Jun. 15, 2003, p. 2717-2721, XP002318190 ISSN: 022-2461.

* cited by examiner

*Primary Examiner*—H. (Holly) T Le
(74) *Attorney, Agent, or Firm*—Connelly Bove Lodge & Hutz LLP

(57) ABSTRACT

The invention relates to a drill bit containing tungsten carbide powder having powder particles which have a core of cast tungsten carbide and a shell of tungsten monocarbide.

15 Claims, 3 Drawing Sheets

DRILL BITS COMPRISING DUAL-PHASE TUNGSTEN CARBIDE MATERIAL

RELATED APPLICATIONS

This application is a continuation of U.S. application Ser. No. 10/579,291, filed May 15, 2006 (incorporated herein by reference), now U.S. Pat. No. 7,541,090, which is a national stage application (under 35U.S.C. §371) of PCT/EP2004/012959, filed Nov. 16, 2004 filed May 15, 2006, which claims benefit of German Patent Application No. DE 103 54 543.3, filed Nov. 21, 2003.

The invention relates to tungsten carbide powders comprising powder particles having a core of cast tungsten carbide and a shell of tungsten monocarbide, the production thereof and their use for components subject to wear or the coating thereof.

Hard materials, particularly tungsten carbides, are put to a wide variety of uses owing to their hardness and resistance. For example, coatings containing these hard materials are applied on to tools, e.g. excavator buckets, to provide these tools with high wear resistance and toughness with respect to friction and impact.

From the group of the tungsten carbides, tungsten monocarbide (WC) and so-called cast tungsten carbide (WSC) are used industrially. WSC is a eutectic mixture of WC and ditungsten carbide ($W_2C$), the average carbon mass ratio generally being between 3.8 and 4.2 wt. %. This corresponds to a phase distribution of 73-80 wt. % $W_2C$ and 20-27 wt. % WC. WSC has a very fine crystal structure, which is often described as a feather-like structure and is obtained by rapid quenching of a carbide melt.

From U.S. Pat. No. 4,834,963, the production of so-called macrocrystalline WC (mWC) is known. This is produced aluminothermally and is distinguished particularly by a very low content of impurities. By adding metallic iron to the starting mixture, the production process takes place within a desired temperature range. Owing to its grain size, mWC is used instead of WSC in many areas. Compared with WSC, however, mWC exhibits distinctly lower hardness and toughness.

For the production of WSC, various processes are known which differ substantially in the type of heat input and heat removal. DE 36 26 031 A1 describes the production of WSC in an electric arc. WSC with a carbon content of 3.5 to 4.2 wt. % and a fine needle-like microstructure is obtained. The hardness HV0.4 is given as 2100 to 2400. The WSC is subjected to classic processing techniques, such as crushing and sieving, so that crushed, fractionated WSC is obtained.

From EP 238 425 B1, DE 199 45 318 A1 and EP 687 650 A1, various processes are known for the production of WSC, which is distinguished by a spherical particle morphology. In addition to an extremely high hardness of over 3000 HV0.1, spherical WSC (sWSC) has advantages over crushed WSC owing to its morphology, e.g. in relation to avoiding power surges under load.

When WSC is processed to produce wear protection coatings or components, the WSC is conventionally mixed with a powdered metal alloy based on Fe, Ni or Co and processed under the action of heat. In the production of drilling heads, a matrix metal, e.g. Cu, can also be supplied by infiltration. However, a heat treatment is necessary in every case. By means of the melting and re-solidification of the matrix metal, the hard material is uniformly distributed and firmly embedded in the ductile metallic matrix.

A great disadvantage of WSC lies in the fact that, during the heat treatment necessary for embedding it in a matrix metal, the WSC is partly dissolved by the metal (B. Z. Li et al.: Acta. Met., vol. 12, no. 4, 566-572 (1999), F. Schreiber: Ziegelindustrie International, 55(6), 12-17 (2002), 1. Aydin et al.: DVS-Bericht 175, 137-142 (1996)). Thus, the proportion of useable hard material decreases and the metal alloy used as matrix material is irreversibly changed by enrichment with tungsten and carbon. Clear limits to a simple increase in the proportion of hard material in the hard material/matrix metal mixture to be processed are set by processing factors. Because of the flow behaviour of the mixture, the proportion of hard material in the mixture with the matrix metal does not usually exceed 60 wt. % for welding applications.

A further complicating factor is that the quantity of dissolved WSC rises as the treatment temperature and duration of the heat treatment increase. To make the effects clear, the manual welding of a wear protection coating can be mentioned as an example. The local quality of the coating produced is directly dependent on the ability, consistency and perseverance of the operator of the device used for welding, since he influences the intensity and duration of the heat treatment. Even in the case of machine welding or similarly standardised processes, the dissolving of the WSC has a negative effect. For example, the temperature for the heat treatment and the rate of welding can only be selected within narrow limits to avoid excessive or even complete dissolving of the WSC.

The dissolving of the WSC can change the matrix material considerably. For example, the solution of carbon and tungsten in the metal results in the uncontrolled precipitation of brittle carbide phases, which reduce the ductility of the matrix and promote crack formation. Even for matrix alloys with a small proportion of additional carbide formers, the dissolving of the WSC is disadvantageous since the usable proportion of hard material is reduced in every case. When Fe-based alloys are used, carbon enrichment can cause the precipitation of austenite, which exhibits poorer wear properties than the desired ferritic phase.

A large number of technical developments are indirectly aimed at curbing the dissolving of the hard material used in the production of wear protection coatings. Thus, for example, matrix alloys with a low melting point, matrix alloys with a small proportion of carbide formers or heating methods with high process consistency in relation to the temperature (Plasma Transferred Arc (PTA), lasers) are used. However, the main problem of the high solubility of WSC in many matrix metals cannot be overcome by these methods.

The object of the present invention was therefore to provide a tungsten carbide that is distinguished by high chemical resistance, especially in a metal melt, and at the same time by high hardness and toughness.

The object is achieved by a tungsten carbide powder having a core of WSC surrounded by a dense shell of WC.

The invention therefore relates to tungsten carbide powders, the powder particles having a core of cast tungsten carbide and a shell of tungsten monocarbide.

The hard material according to the invention, abbreviated below as "cWSC", can be obtained by converting WSC to WC to a certain depth by carburising, and can be used e.g. for the production of wear protection coatings and wear-resistant components.

The cWSC according to the invention is distinguished particularly by the fact that the outstanding toughness and hardness of the WSC in the core of the WC/WSC composite are maintained even when it is processed by conventional means, i.e. brought into contact with a liquid matrix material.

The tungsten carbide powder according to the invention preferably has a bound carbon content of 4 to 6 wt.%, particularly preferably of 4.5 to 5.5 wt. % and especially preferably of 4.3 to 4.8 wt. %. The free carbon content should not exceed 0.1 wt. %.

If the bound carbon content is less than 4 wt. %, a sufficiently dense WC shell is not formed and so no increase in chemical resistance can be observed compared with WSC. If the bound carbon content comes close to the limit of 6.13 wt. %, corresponding to pure WC, the WSC core becomes so small that an increase in hardness compared with pure WC is no longer achieved.

The advantageous properties of the tungsten carbide powder according to the invention are maintained even if it exhibits a small proportion of WC particles, i.e. not all the powder particles are made up of a core of WSC and a WC shell. Tungsten carbide powders of this type are therefore also in accordance with the invention. However, preferably at least 90% of the powder particles exhibit a core of WSC and a WC shell, particularly preferably at least 95%, especially preferably at least 99%.

The average particle size can vary within a broad range and depends in particular on the planned use of the cWSC. The particle size determined by Ro-Tap sieve analysis according to ASTM B 214 can be up to 3000 μm, for example. If the cWSC is to be used for the production of wear protection coatings using the PTA process, a particle size fraction determined by Ro-Tap sieve analysis according to ASTM B 214 of 40 to 160 μm has proved advantageous. The average particle size can be adjusted e.g. by selecting a WSC powder with a particular average particle size as the educt for the production of the cWSC. However, it is also possible, for example, to mix or separate certain grain fractions from previously produced cWSC, e.g. by sieving or screening.

In the tungsten carbide powder according to the invention, the WSC core is surrounded by a dense shell of tungsten monocarbide. The thickness of the shell, determined by light microscopy on the etched material, is preferably 0.05 to 0.4 times the average particle size determined by Ro-Tap sieve analysis according to ASTM B 214, particularly preferably 0.05 to 0.15 times.

cWSC exhibits excellent hardness. The Vickers hardness is preferably >2000 HV0.1, particularly preferably >2500 HV0.1.

The morphology of the particles can be adjusted e.g. by using a suitable WSC powder.

The tungsten carbide powder according to the invention can therefore exhibit various morphologies, e.g. sharp-edged crushed or spherical. The spherical morphology offers advantages in principle with respect to the wear resistance, but its production is more complex than powders with an irregular morphology.

The invention also provides a process for the production of the tungsten carbide (cWSC) according to the invention, wherein cast tungsten carbide powder is heated in the presence of a carbon source to a temperature of 1300 to 2000° C., preferably 1400 to 1700° C.

The process according to the invention can be carried out in the presence of inert gas, in the presence of reactive gas or in a vacuum. It is preferable to work in the presence of hydrogen.

A gaseous carbon source, e.g. carbon monoxide, a $CO/CO_2$ mixture, a hydrocarbon or a hydrocarbon mixture, such as for example natural gas, is particularly suitable as the reactive gas.

Gaseous and solid carbon sources are suitable as the carbon source. Carbon black or graphite, for example, can be used as a solid carbon source. It is, of course, also possible to use mixtures of different gaseous and/or solid carbon sources.

As a result of the heat treatment of WSC in the presence of the carbon source, a conversion of $W_2C$ to WC occurs on the surface. Thus, a dense layer of WC forms around the WSC.

Temperature, reaction time and the quantity of carbon source added should be selected such that the shell of WC forms in the desired thickness. It should be ensured that WSC is maintained inside the particles. The conditions to be observed are substantially determined by the particle size and particle shape of the WSC powder employed and can be determined by means of simple series of tests. If the carbon content is set too high, this increases the time and temperature required for the reaction and reduces the proportion of the feather-like structure, i.e. the proportion of WSC, unnecessarily.

It has proved advantageous to add the carbon source in a quantity such that the total carbon content in the reaction mixture, i.e. the sum of the carbon contents of WSC and carbon source, is 4 to 6 wt. %, preferably 4.3 to 5.5 wt. %.

In the reaction of WSC with powder particles of widely varying grain sizes, finer grain fractions can be carburised more heavily in relation to their particle diameter than coarse grains. This applies especially to powders with a high fines content of <45 μm and can be avoided by previously separating off the fines and reacting the different powder fractions separately.

The reactions times can be e.g. 1 to 10 hours, preferably 1.5 to 7 hours.

To produce the tungsten carbide according to the invention, it is therefore possible to start e.g. from crushed or spherical WSC, which is sieved to the desired grain size. The material is then intimately mixed with a carbon source, e.g. carbon black, in the desired quantity, subjected to a heat treatment and carburised at the surface layer during this treatment. Conventional pusher-type furnaces or comparable units, for example, which can operate e.g. in the temperature range between 1550 and 1900° C. under a hydrogen atmosphere or inert gas, are suitable for the heat treatment. The mixture of WSC and carbon black is charged into graphite boats, for example. During the reaction, the carbon reacts with the $W_2C$ present in the WSC and converts this to WC, which can no longer be distinguished from the WC already present. The resulting WC surface layer forms a natural diffusion barrier for the carbon, and so the desired carburising depth can be controlled by means of the parameters of time and temperature.

cWSC according to the invention can be processed in a conventional manner by sintering, spraying, welding, infiltration, spinning or other processes suitable for the production of a dense composite material. It is excellently suited to the production of surface coatings for components subject to wear. For this purpose, cWSC is generally mixed with a matrix metal, e.g. an alloy based on Fe, Ni or Co, and then applied to the surface to be protected by means of the above processes, particularly by welding.

The invention thus also provides the use of the tungsten carbide powders according to the invention for the surface coating of components subject to wear and for the production of drill bits.

The following examples serve to explain the invention in more detail, with the intention of facilitating comprehension of the principle according to the invention, and should not be understood as a limitation thereof.

EXAMPLES

The total carbon content was determined by burning the sample in an oxygen stream with thermal conductivity detection, and the free carbon content by acid digestion (HF/HNO$_3$/H$_3$PO$_4$) and subsequent non-dispersive infrared absorption after burning in an oxygen stream. The bound carbon content corresponds to the difference between total and free carbon.

Example 1

WSC with a grain size of −150+45 μm with approx. 3.94 wt. % bound and 0.035 wt. % free carbon was mixed with carbon black (BET specific surface: 10 m$^2$/g). The quantity of carbon black added was selected such that a total carbon content of C$_{total}$=5.7 wt. % resulted. The mixture was charged into graphite boats and annealed under hydrogen for 2 h at 1550° C. in a pusher-type furnace. The resulting cWSC was prepared in cross section, etched to show the phase composition and investigated under a reflected light microscope. A micrograph (1000× magnification) is reproduced in FIG. 1.

Figure 1:
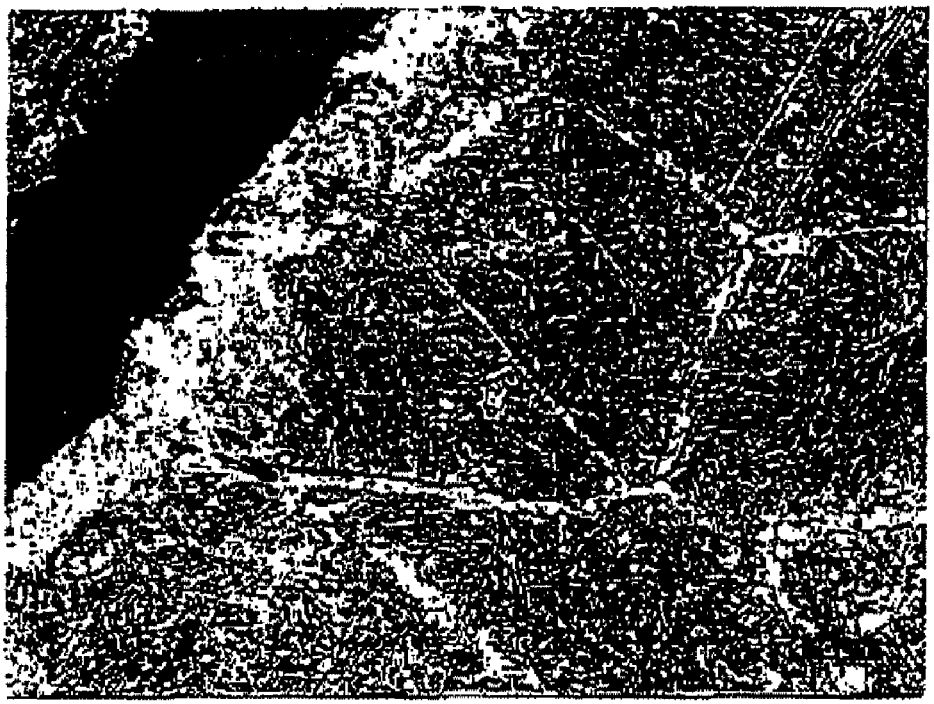
FIG. 1 is a reproduced micrograph (1000× magnification) of the dual phase tungsten carbide particles produced according to Example 1.

After carburisation, the coarse particles have a surface layer of WC approx. 15 μm thick, which is visible in FIG. 1 as a light-coloured outer layer. Particles with a large length-width ratio (aspect ratio), i.e. particles with an elongated shape, are in some cases completely carburised. The end product exhibited 5.26 wt. % bound carbon and 0.41 wt. % free carbon. The high free carbon content shows that the carbon offered under the carburising conditions selected was not completely taken up. The proportions of the sieve fractions between 150 μm and 45 μm did not change in comparison with the starting material as a result of the treatment.

Figure 2:
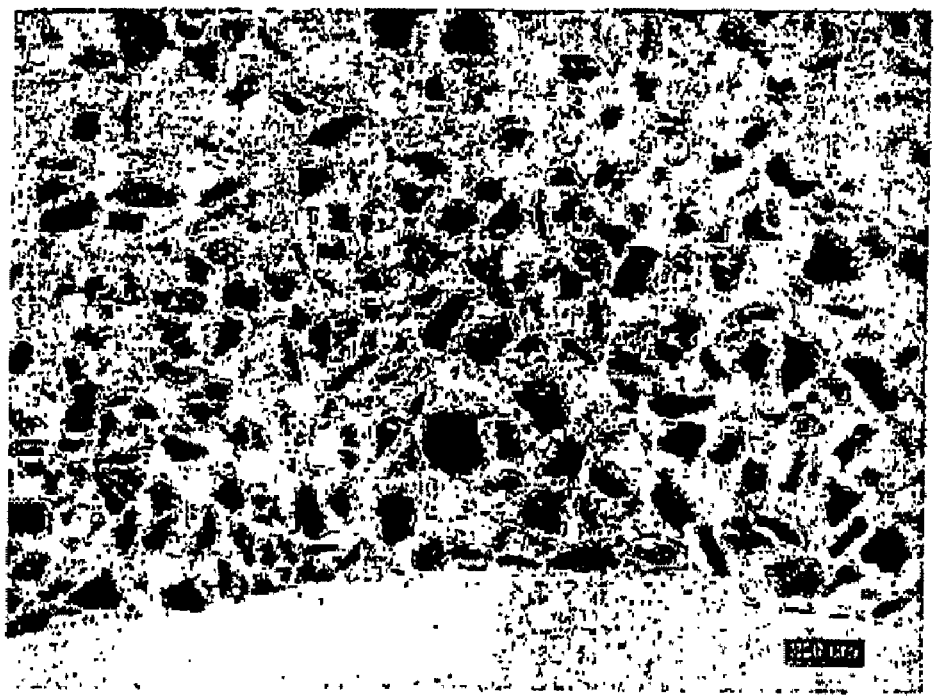
FIGS. 2 and 3 are micrographs (50× magnification and 500× magnification respectively) of a cross section of the tungsten carbide of Example 1 after welding.
Figure 3:

4 kg of Ni-3B-3Si alloy with a grain size of −150+53 μm were added as matrix metal to 6 kg of the tungsten carbide thus obtained, and this was welded on to a steel substrate in one and two layers by plasma transferred arc (PTA) welding using a manual torch at 70-80A/approx. 30V. The material tended to form a turbulent molten bath and to form splashes, which can be attributed to the high proportion of free carbon. The test-pieces were investigated in cross section under a reflected light microscope. Micrographs are reproduced in FIG. 2 (50× magnification) and FIG. 3 (500× magnification).

The structure formed during welding is almost free from carbide precipitations. Matrix metal and hard material are maintained in their original composition. In particular, the surface zone exposed to the atmosphere and subjected to strong thermal stress displays a high content of intact hard material which is unchanged in comparison with the middle and lower region of the thermal impact zone, a considerable number of particles even projecting out of the surface exposed to the atmosphere.

Figure 4:
FIGS. 4 and 5 are micrographs (50× magnification and 500× magnification, respectively) of a cross section of the starting cast tungsten carbide WSC (used to produce the tungsten carbide in Example 1) after welding.
Figure 5:

For comparison purposes, the WSC used to produce the tungsten carbide according to the invention was welded under identical conditions. The WSC dissolves almost completely in the outer surface zone to a depth of 200-500 μm. Fine carbides are precipitated. The test-pieces were investigated in cross section under a reflected light microscope. Micrographs are reproduced in FIG. 4 (50× magnification) and FIG. 5 (500× magnification). The fine carbide particles can be seen clearly.

By means of quantitative image analysis it was found that, for the same quantity of hard material used, the number of hard material particles embedded in the composite material is approx. 30% higher compared with the non-carburised reference material (WSC) welded under the same conditions.

Example 2

WSC with a grain size of −150+45 μm was reacted with carbon black as in Example 1. However, the duration of the treatment was 6 h. A cWSC with 5.48 wt. % bound and 0.06 wt. % free carbon resulted. The grain size distribution was not affected by the prolonged reaction time. As expected, it was possible to reduce the ratio of free to bound carbon compared with Example 1 by the prolonged heat treatment. As in Example 1, 6 kg of cWSC were mixed with 4 kg of Ni-3B-3Si alloy and welded using a PTA manual torch. The lower content of free carbon had a positive effect on the welding behaviour compared with Example 1. In the microscopic investigation of the weld layer, it was shown that the number of undissolved tungsten carbide particles could be increased by a further 10%, i.e. by a total of 40%, compared with the non-carburised comparative sample (WSC).

Example 3

WSC with a grain size of −150+45 μm was reacted with carbon black as in Example 1. However, a smaller quantity of carbon black was used, so that the total carbon content of the mixture was 4.3 wt. %. A cWSC with 4.3 wt. % bound and 0.01 wt. % free carbon resulted. Owing to the small quantity of added carbon source, only a very thin shell of WC formed. As in Example 1, 6 kg of the tungsten carbide thus obtained were mixed with 4 kg of Ni-3B-3Si alloy and welded using a PTA manual torch. The welding behaviour of the mixture was indistinguishable from that of the non-carburised comparative sample (WSC). In the microscopic investigation of the weld layer, it was shown that the dissolving of the tungsten carbide was able to be largely suppressed, despite the very thin shell of WC. Compared with Examples 1 and 2, however, a distinctly higher proportion of carbides formed, which were precipitated from the melt in the metallic matrix during cooling. Compared with the non-carburised comparative material (WSC), an increase of about 18% was achieved in the number of tungsten carbide particles remaining in the welded-on layer.

Figure 6:
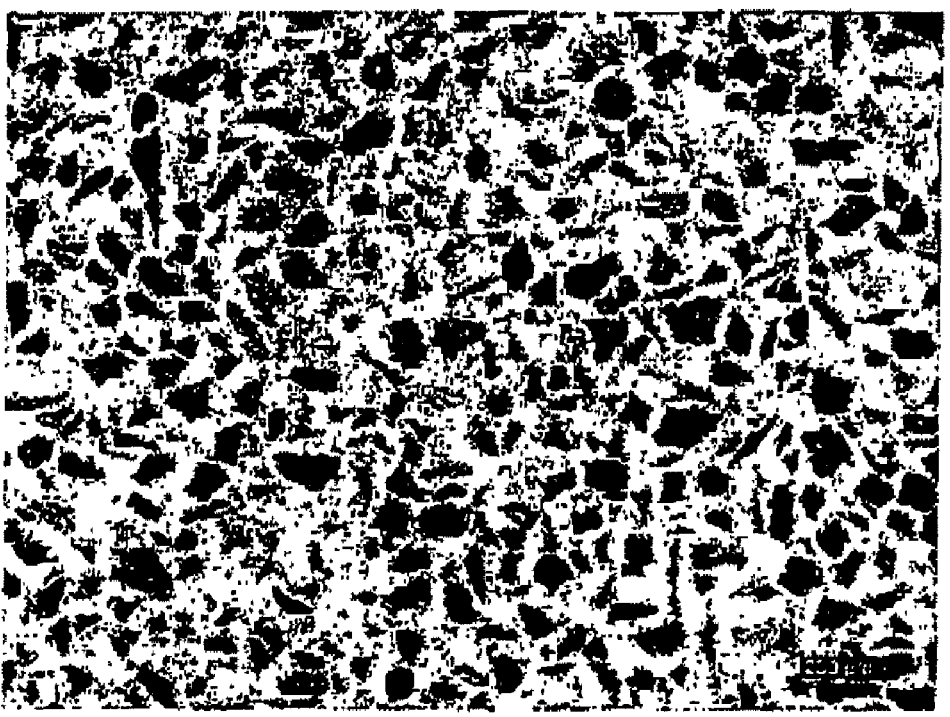
FIG. 6 shows a micrograph (50× magnification) of a cross section of the tungsten carbide of Example 3 after welding.

FIG. 6 shows a micrograph (50× magnification) of a cross section of the tungsten carbide after welding. A small number of fine carbide particles can be seen.

Example 4

Comparison

For comparative purposes, 4 kg of an Ni-3B-3Si alloy were added to 6 kg of macrocrystalline WC with a grain size of −150+45 μm with 6.1 wt. % bound carbon as in Example 1, and this was welded under the conditions given in Example 1. As expected, the macrocrystalline WC did not dissolve during welding. The proportion of particles of hard material in the welded layer is approx. 48% higher than when the WSC starting material from Example 1 is used. The hardness of the macrocrystalline WC in the weld layer was approx. 1500

HV0.1 and was thus distinctly lower than the hardness of the cWSC from Examples 1-3 according to the invention, which can be given as 2200-2500 HV0.1. The average hardness of the matrix metal after welding was approx. 700 HV0.1.

The invention claimed is:

1. A drill bit which comprises a tungsten carbide powder which consists essentially of powder particles which have a core of cast tungsten carbide and a shell of tungsten monocarbide.

2. The drill bit as claimed in claim 1, wherein the tungsten carbide powder has a bound carbon content of 4 to 6 wt. %.

3. The drill bit as claimed in claim 1, wherein the tungsten carbide powder has a bound carbon content of 4.5 to 5.5 wt. %.

4. The drill bit as claimed in claim 1, wherein the tungsten carbide powder has a bound carbon content of 4.3 to 4.8 wt. %.

5. The drill bit as claimed in claim 4, wherein the tungsten carbide powder has a free carbon content that does not exceed 0.1 wt. %.

6. The drill bit as claimed in claim 5, wherein the tungsten carbide powder has a hardness of >2500 HVO.1 and the thickness of the shell of tungsten monocarbide is 0.05 to 0.4 times the average particle size.

7. The drill bit as claimed in claim 6, wherein the tungsten carbide powder have particles which have a sharp-edged crushed morphology.

8. The drill bit as claimed in claim 6, wherein the tungsten carbide powder have particles which have a spherical morphology.

9. The drill bit as claimed in claim 1, wherein the tungsten carbide powder has a free carbon content that does not exceed 0.1 wt. %.

10. The drill bit as claimed in claim 1, wherein the tungsten carbide powder has a particle size determined by Ro-Tap sieve analysis in accordance with ASTM B 214 is up to 3000 μm.

11. The drill bit as claimed in claim 1, wherein the tungsten carbide powder has a thickness of the shell of tungsten monocarbide that is 0.05 to 0.4 times the average particle size.

12. The drill bit according to claim 1, wherein the tungsten carbide powder has a hardness of >2000 HVO.1.

13. The drill bit as claimed in claim 1, wherein the tungsten carbide powder has a hardness of >2500 HVO.1 and the thickness of the shell of tungsten monocarbide is 0.05 to 0.4 times the average particle size.

14. The drill bit as claimed in claim 1, wherein the tungsten carbide powder have particles which have a sharp-edged crushed morphology.

15. The drill bit as claimed in claim 1, wherein the tungsten carbide powder have particles which have a spherical morphology.

* * * * *